United States Patent
Jung

(10) Patent No.: US 11,518,389 B2
(45) Date of Patent: Dec. 6, 2022

(54) METHOD OF CONTROLLING BRAKING WHEN STEERING IN-WHEEL MOTOR VEHICLE

(71) Applicants: HYUNDAI MOTOR COMPANY, Seoul (KR); KIA MOTORS CORPORATION, Seoul (KR)

(72) Inventor: Dae Suk Jung, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 231 days.

(21) Appl. No.: 16/874,891

(22) Filed: May 15, 2020

(65) Prior Publication Data

US 2021/0221378 A1 Jul. 22, 2021

(30) Foreign Application Priority Data

Jan. 22, 2020 (KR) .................. 10-2020-0008236

(51) Int. Cl.
*B60W 30/18* (2012.01)
*B60W 10/184* (2012.01)
*B60W 10/20* (2006.01)
*B60W 40/064* (2012.01)

(52) U.S. Cl.
CPC .... *B60W 30/18172* (2013.01); *B60W 10/184* (2013.01); *B60W 10/20* (2013.01); *B60W 30/18145* (2013.01); *B60W 40/064* (2013.01); *B60W 2422/70* (2013.01); *B60W 2510/202* (2013.01); *B60W 2520/26* (2013.01); *B60W 2540/18* (2013.01); *B60W 2710/12* (2013.01)

(58) Field of Classification Search
CPC .......... B60W 30/18172; B60W 10/20; B60W 30/18145
See application file for complete search history.

(56) References Cited

U.S. PATENT DOCUMENTS

| | | | |
|---|---|---|---|
| 10,399,440 B2* | 9/2019 | Zhao ..................... | B60W 10/18 |
| 10,597,070 B2* | 3/2020 | De Carteret ......... | B62D 15/025 |
| 2002/0147532 A1* | 10/2002 | Inagaki .................. | B62D 7/159 |
| | | | 701/91 |
| 2005/0258685 A1* | 11/2005 | Post, II ................. | B60T 8/4809 |
| | | | 303/142 |
| 2014/0207355 A1* | 7/2014 | Akaho ................... | B60K 28/16 |
| | | | 701/70 |
| 2016/0207538 A1* | 7/2016 | Urano ................... | B60W 50/10 |
| 2017/0106755 A1* | 4/2017 | Nakatsu ............... | B60L 15/2009 |
| 2018/0236875 A1* | 8/2018 | Sugai ..................... | B60L 3/102 |
| 2019/0193781 A1* | 6/2019 | Jang ..................... | B60W 40/103 |
| 2019/0202441 A1* | 7/2019 | Suzuki ................ | B60K 17/356 |
| 2019/0241176 A1* | 8/2019 | Suzuki ................ | B60W 30/045 |
| 2020/0369277 A1* | 11/2020 | Sugai ..................... | B60G 17/06 |
| 2021/0213935 A1* | 7/2021 | Lu ..................... | B60W 50/0098 |

* cited by examiner

*Primary Examiner* — Peter D Nolan
*Assistant Examiner* — Mikko Okechukwu Obioha
(74) *Attorney, Agent, or Firm* — Morgan, Lewis & Bockius LLP

(57) ABSTRACT

A method of controlling braking when steering an in-wheel motor vehicle includes monitoring a required tire rotation angle for each steering angle and an actual tire rotation angle when performing cooperative control of an in-wheel motor for reducing a steering load, and generating a vehicle braking force in a case where the actual tire rotation angle exceeds the required tire rotation angle, thereby easily preventing a vehicle-skidding phenomenon.

7 Claims, 5 Drawing Sheets

METHOD OF CONTROLLING BRAKING WHEN STEERING IN-WHEEL MOTOR VEHICLE

CROSS REFERENCE TO RELATED APPLICATION

The present application claims the benefit of priority to Korean Patent Application No. 10-2020-0008236, filed on Jan. 22, 2020 in the Korean Intellectual Property Office, the entire disclosure of which is incorporated herein by reference.

TECHNICAL FIELD

The present disclosure relates to a method of controlling braking when steering an in-wheel motor vehicle. More particularly, the present disclosure relates to a system for and a method of controlling braking when steering an in-wheel motor vehicle, in which the braking is controlled for preventing a vehicle-skidding phenomenon due to traveling on an inclined road, when performing cooperative control of an in-wheel motor for reducing a steering load.

BACKGROUND

Electric vehicles, which are types of environment-friendly vehicles that emit no exhaust gas, are each essentially equipped with a high-voltage battery that supplies electric energy for a vehicle to travel, an inverter that converts direct current power that is output from the high-voltage battery, into alternating current power, a vehicle-traveling motor that receives the alternating current power from the inverter and generates a rotational force for the vehicle to travel, and so on. In order for the electric vehicle to travel, driving power of the motor is decelerated by a speed reducer and then is transferred to a driving shaft and a traveling wheel of the vehicle.

An example of the electric vehicle is an in-wheel motor vehicle in which a motor is installed directly into a rim of a wheel on which a tire is mounted.

In the in-wheel motor vehicle, a power transfer apparatus, such as a speed reducer or a differential gear, that serves as an intermediate apparatus, is not installed. Thus, the weight of the vehicle can be reduced, and the driving power of the motor can be transferred directly to the wheel. This provides an advantage of reducing energy loss while power transfer is in progress.

For a steering system, the in-wheel motor vehicle is also equipped with a motor-driven power steering (MDPS) system.

The MDPS is configured to include a torque sensor that detects a steering torque, a steering angle detection sensor that detects a steering angle, a vehicle speed sensor that detects a vehicle speed, a steering controller that determines an electric-current control value for steering assistance or the like on the basis of a detection signal (a tuning parameter) of each sensor, a motor that operates for the steering assistance according to electric current that is applied from the steering controller, and so on.

A reduction in the capacity of a steering-assistance motor, which is among components for the MDPS, is desirable as a method of saving the cost of a component package for the MDPS.

To this end, cooperative control of an in-wheel motor, which is among steering assistance logics, is performed considering the characteristic that a central position of a tire changes when steering a steering wheel. Thus, the capacity of the motor in the MDPS can be reduced by 20% to 40%.

Specifically, as illustrated in FIG. 1, the cooperative control of the in-wheel motor is performed in such a manner that, when steering a steering wheel 10, the respective left and right in-wheel motors 30 and 32 of front wheels are driven by an angle as large as a required tire rotation angle determined by a controller 20. Thus, an outside wheel (an outside tire with respect to a steering direction) of the front wheels is rotated in the forward direction and, at the same time, an inside wheel (an inside tire with respect to the steering direction) of the front wheels is driven in the backward direction. As a result, the capacity of the motor in the MDPS can be reduced by 20% to 40%.

However, when performing the cooperative control of the in-wheel motor for reducing the steering load, the in-wheel motor has to be driven. Therefore, a braking force of a front-wheel braking apparatus temporarily is caused to stop being applied. At this time, due to the temporary non-application of the braking force of the front-wheel braking apparatus, a vehicle-skidding phenomenon occurs in a situation where a load on the vehicle is heavy (for example, when the vehicle travels on an inclined road, when five or more persons ride in the vehicle, or the like). Thus, a vehicle accident may occur.

The information disclosed in the Background section above is to aid in the understanding of the background of the present disclosure, and should not be taken as acknowledgement that this information forms any part of prior art.

SUMMARY

An objective of the present disclosure is to provide a method of controlling braking when steering an in-wheel motor vehicle, the method being capable of performing cooperative control of an in-wheel motor for reducing a steering load and thus easily preventing a vehicle-skidding phenomenon. In this method, when performing the cooperative control of the in-wheel motor for reducing the steering load, a required tire rotation angle for each steering angle and an actual tire rotation angle are monitored, and in a case where the actual tire rotation angle exceeds the required tire rotation angle, it is determined that a vehicle-skidding state is entered, the cooperative control of the in-wheel motor for reducing the steering load is caused to temporarily stop being performed, and at the same time, a vehicle braking force is generated.

According to an aspect of the present disclosure, a method of controlling braking when steering an in-wheel motor vehicle may include: deciding, by a first controller, whether or not cooperative control of an in-wheel motor for reducing a steering load is necessary; determining, by the first controller, before performing the cooperative control of the in-wheel motor for reducing the steering load, whether or not a vehicle-skidding phenomenon occurs; performing, by a second controller, control that maintains a braking force due to operation of a braking apparatus when the first controller determines that the vehicle-skidding phenomenon occurs; and performing, by the first controller, the cooperative control of the in-wheel motor for reducing the steering load when the first controller determines that the vehicle-skidding phenomenon does not occur.

In the method, in the deciding whether or not cooperative control of an in-wheel motor is necessary, the cooperative control of the in-wheel motor for reducing the steering load may be decided as being necessary when a result of comparing a steering torque, measured by a steering torque sensor when steering a steering wheel, and a reference value is that the steering torque exceeds the reference value.

In the method, the determining whether or not a vehicle-skidding phenomenon occurs may include: determining a required tire rotation angle θ for steering a steering wheel; monitoring an actual tire rotation angle; and comparing the determined required tire rotation angle θ and the monitored actual tire rotation angle. When the actual tire rotation angle exceeds the required tire rotation angle θ, the first controller determines that the vehicle-skidding phenomenon occurs, and when the actual tire rotation angle does not exceed the required tire rotation angle θ, the first controller determines that the vehicle-skidding phenomenon does not occur.

In the method, in the determining a required tire rotation angle θ for steering a steering wheel, the required tire rotation angle θ may be determined using θ=L×360/(2πR) where L is a required movement distance of a tire for reducing the steering load and R is a wheel radius, or the required tire rotation angle θ may be determined using θ=K/R×α where K is a distance between a kingpin axis and a tire wheel center and α is a current tire rotation angle.

In the method, in the monitoring an actual tire rotation angle, an angle sensor mounted on the in-wheel motor may transfer a signal representing the detected tire rotation angle, to the first controller.

In the method, in the performing control that maintains a braking force due to operation of a braking apparatus, the second controller may perform the control that maintains the braking force due to operation of a front-wheel braking apparatus when the first controller transfers a signal that decides to temporarily stop the cooperative control of the in-wheel motor for reducing the steering load, to the second controller.

In the method, the deciding whether or not cooperative control of an in-wheel motor for reducing a steering load is required may include: temporarily stopping an application of the braking force of the braking apparatus such that the in-wheel motor is driven; determining a required tire rotation angle θ for reducing the steering load; and driving the in-wheel motor by an angle as large as the required tire rotation angle θ.

The method of controlling braking when steering an in-wheel motor vehicle provides the following advantages.

According to the present disclosure, when performing cooperative control of an in-wheel motor for reducing a steering load, in a case where an actual tire rotation angle exceeds a required tire rotation angle, it is determined that a vehicle-skidding state is entered, and then, the cooperative control of the in-wheel motor is caused to temporarily stop being performed, and at the same time, a braking force of a braking apparatus is generated. Thus, the vehicle-skidding phenomenon due to traveling on an inclined road, or the like can be easily prevented.

That is, before performing the substantial cooperative control of the in-wheel motor for reducing the steering load, a braking force of a front-wheel braking apparatus is generated in a situation where a load on the vehicle is heavy (for example, when the vehicle travels on an inclined road, when five or more persons ride in the vehicle, or the like). Thus, the vehicle-skidding phenomenon can be easily prevented.

DETAILED DESCRIPTION

Preferable embodiments of the present disclosure will be described in detail below with reference to the accompanying drawings.

Figure 1:
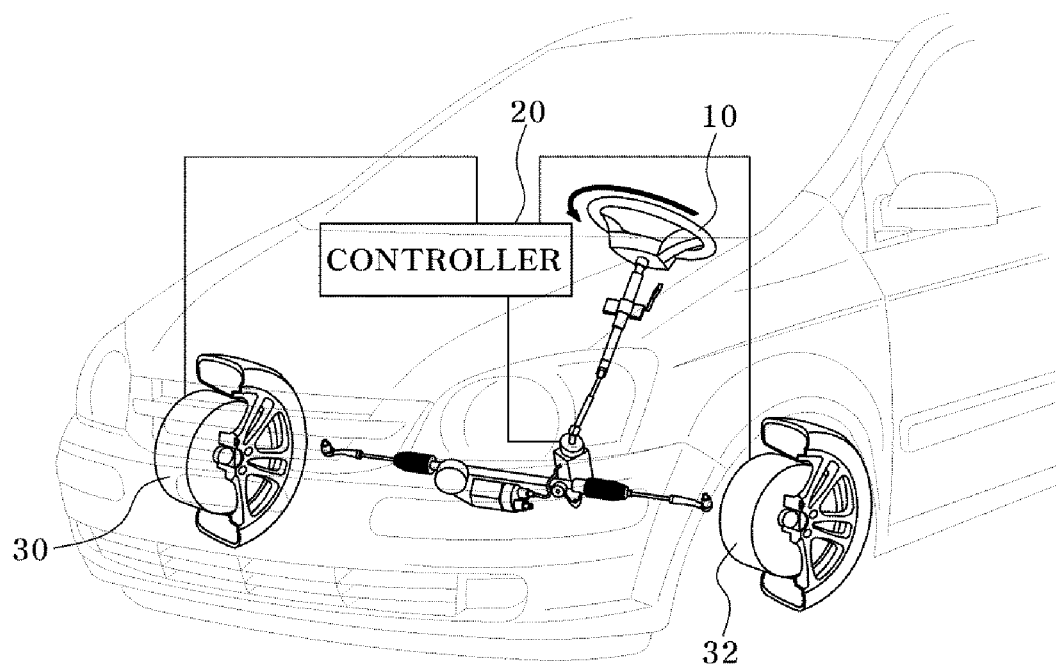
FIG. 1 is a configuration diagram for cooperative control of an in-wheel motor for reducing a steering load according to an exemplary embodiment of the present disclosure.
Figure 2:
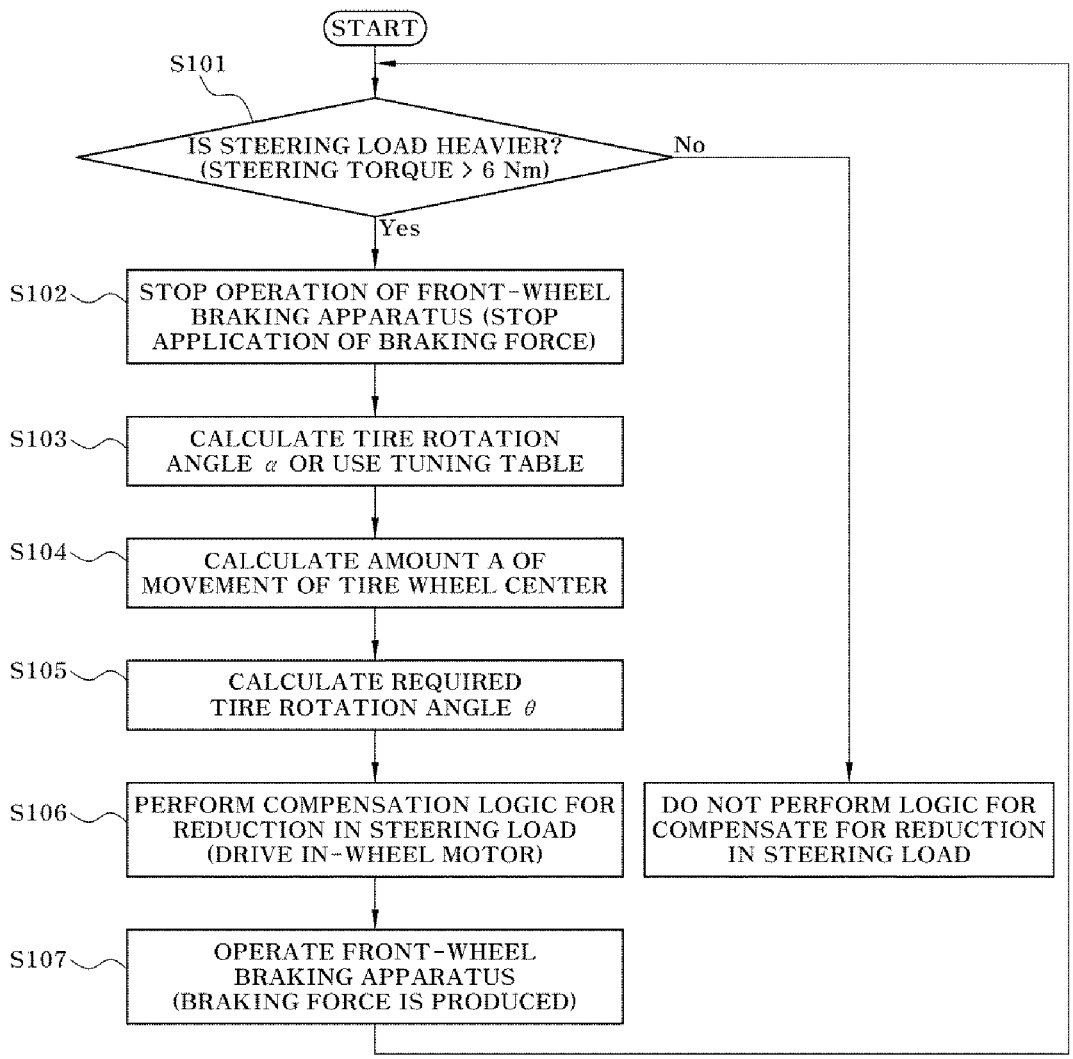
FIG. 2 is a flowchart illustrating a process for the cooperative control of the in-wheel motor for reducing the steering load according to an exemplary embodiment of the present disclosure.

First, a method of performing cooperative control of an in-wheel motor for reducing a steering load when turning a steering wheel will be described below with reference to the accompanying FIGS. 1 and 2 in order to help to get a understanding of the present disclosure.

A magnitude of the steering load is determined when a driver turns a steering wheel 10 (S101).

For example, a controller 20 determines whether or not a steering torque measured by a steering torque sensor exceeds a reference value (for example, 6 Nm).

Subsequently, when the steering torque exceeds the reference value, an in-wheel motor has to be driven to perform the cooperative control of the in-wheel motor for reducing the steering load. Thus, a braking force of a front-wheel braking apparatus is caused to temporarily stop being applied (S102).

For example, through cooperative control in cooperation with a braking controller, the controller 20 causes front wheel braking to stop being applied, and thus causes an in-wheel motor of a front wheel to be in a state where driving control is possible.

That is, when, from a signal of a brake pedal sensor (BPS), it is checked that the driver keeps on pushing on a brake pedal, the controller 20 has to drive the in-wheel motor in order to perform the cooperative control of the in-wheel motor for reducing the steering load. Therefore, the controller 20 forces the braking force of the front-wheel braking apparatus to temporarily stop being applied and thus causes the in-wheel motor to be in the state where the driving control is possible.

Next, the controller 20 determines a tire rotation angle α (a steering angle of a tire when viewed from above the tire) that varies with a steering angle, or extracts the tire rotation angle α using a tuning map or a tuning table that, as illustrated in the following Table 1, shows the tire rotation angle (a tire inner-wheel angle or a tire outer-wheel angle) that varies with the steering angle (S103).

That is, the above map or table shows pieces of data, as values that vary with the steering angle, each of which contains a tire angle that is set. The controller 20 may decide a tire angle corresponding to a current steering angle using the map or table.

The tire angles here may include the tire outer-wheel angle and the tire inner-wheel angle. The tire outer-wheel angle and the tire inner-wheel angle mean an angle of an outside tire and an angle of an inside tire, respectively, that are formed when a vehicle turns according to driver's steering.

TABLE 1

| Steering Angle | Tire Inner-wheel Angle | Tire Outer-wheel Angle |
|---|---|---|
| 0 | 0 | 0 |
| 10 | 0.77 | 1.55 |
| 20 | 1.55 | 2.34 |
| . | . | . |
| . | . | . |
| . | . | . |

Subsequently, the controller 20 determines an amount A of movement (a movement distance) of a tire wheel center (S104).

Figure 3:
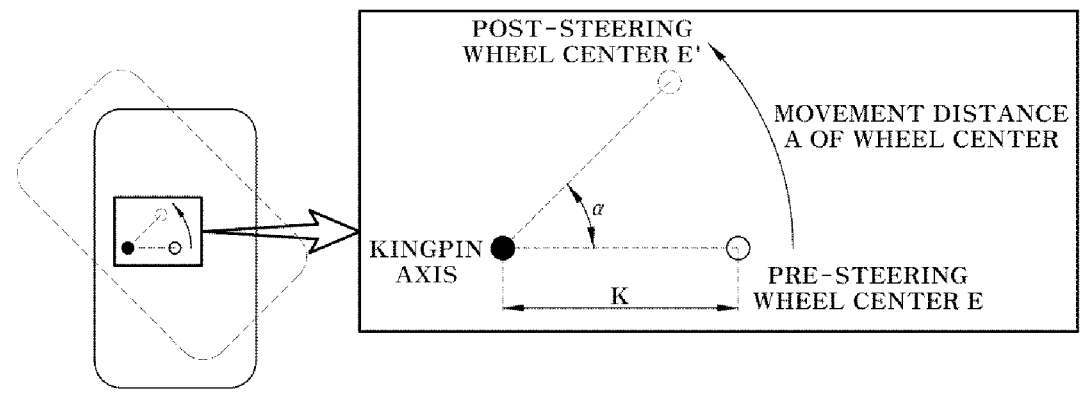
FIG. 3 is a schematic diagram illustrating the principle behind determination of an amount A of movement of a tire wheel center according to an exemplary embodiment of the present disclosure.

The amount A of the movement of the tire wheel center, as illustrated in FIG. 3, may be determined as a movement distance from a pre-steering wheel sensor E to a post-steering wheel center E', using a distance K between a kingpin axis and the tire wheel center, and the current tire rotation angle α.

Accordingly, the amount A of the movement of the tire wheel center may be determined using the following Equation 1.

$$A = 2\pi K \times (\alpha/360)$$ Equation 1

Next, the controller 20 determines a required tire rotation angle θ for reducing the steering load (S105).

Figure 4:
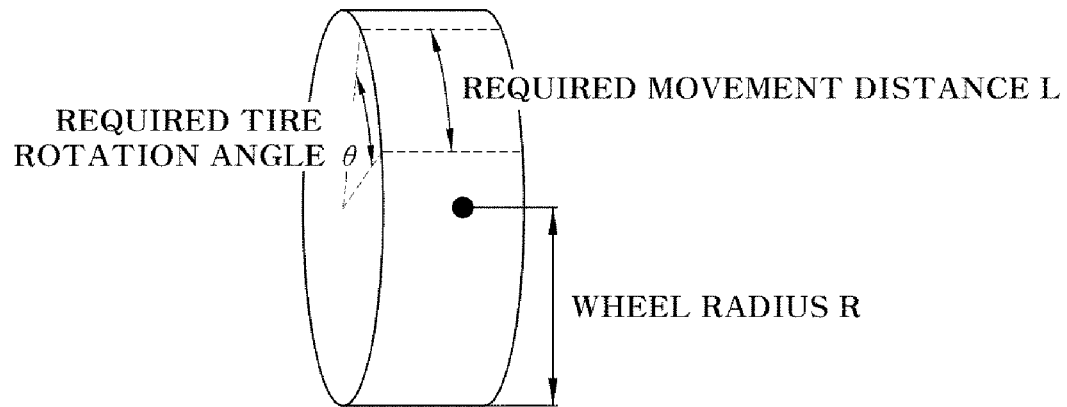
FIG. 4 is a schematic diagram illustrating the principle behind determination of a required tire rotation angle θ according to an exemplary embodiment of the present disclosure.

The required tire rotation angle θ refers to a required tire rotation angle θ with respect to a tire rotation direction and, as illustrated in FIG. 4, may be determined using a required movement distance L of a tire for reducing the steering load and a wheel radius R.

Accordingly, the required tire rotation angle θ may be determined using the following Equation 2.

$$\theta = L \times 360/(2\pi R)$$ Equation 2

At this time, the amount A of the movement of the tire wheel center and the required movement distance L of the tire are almost the same (A≈L). When it is assumed that 'A=L', the required tire rotation angle θ may be determined from a movement distance A of a wheel center and a tire radius R, using the following Equation 3.

$$\theta = A \times 360/(2\pi R)$$ Equation 3

Alternatively, when Equation 1 is substituted for A in the above Equation 3, the following Equation 4 is obtained. Therefore, the required tire rotation angle θ may be determined from the tire rotation angle α, using the following Equation 4.

$$\theta = K/R \times \alpha$$ Equation 4

Next, the controller 20 performs a compensation logic for a substantial reduction in the steering load (S106).

That is, when the required tire rotation angle θ is decided as described above, the controller 20 performs compensation control for reducing the steering load, on the basis of the required tire rotation angle θ of the front wheel, which is decided, using the in-wheel motor of the front wheel.

In this compensation control process for the reduction in the steering load, the controller 20 forces the in-wheel motor of the front wheel to be driven by an angle as large as the required tire rotation angle θ and thus reduces the steering load.

For example, with a control signal of the controller 20, the respective left and right in-wheel motors 30 and 32 of front wheels are forced to be driven by an angle as large as the required tire rotation angle θ. Thus, the cooperative control of the in-wheel motor, which drives an outside wheel (an outside tire with respect to a steering direction) of the front wheels in the forward direction and, at the same time, drives an inside wheel (an inside tire with respect to the steering direction) of the front wheels in the backward direction, is performed. As a result, the steering load can be reduced. Accordingly, this operation can find application for a reduction in the capacity of the motor in a motor-driven power steering system.

For reference, when the controller 20 that decides the required tire rotation angle θ is a controller (MDPS ECU) of a steering apparatus, this controller can perform cooperative control in cooperation with a motor controller in order to perform the driving control of the in-wheel motor of the front wheel that steers.

As described above, the in-wheel motor of the front wheel is forced to be driven in order to compensate for an angle as large as the required tire rotation angle θ of the front wheel, and thus the steering load on the steering apparatus can be reduced. When the driver keeps on pushing on the brake pedal after the performing of the compensation logic for the reduction in the steering load is finished, the braking force due to the operation of the front-wheel braking apparatus is produced (S107).

However, when performing the cooperative control of the in-wheel motor for reducing the steering load, the in-wheel motor has to be driven. Therefore, as described above, the braking force of the front-wheel braking apparatus is caused to temporarily stop being applied. At this time, a vehicle-skidding phenomenon due to the temporary non-application of the braking force of the front-wheel braking apparatus may occur in a situation where a load on the vehicle is heavy (for example, when the vehicle travels on an inclined road, when five or more persons ride in the vehicle, or the like).

In order to solve this problem, according to a fundamental aspect of the present disclosure, in a case where it is determined that, when performing the cooperative control of the in-wheel motor for reducing the steering load, a vehicle-skidding state is entered in the situation where the load on the vehicle is heavy, or the like, the cooperative control of the in-wheel motor is caused to temporarily stop being performed, and at the same time, the braking force of the braking apparatus is automatically generated. Thus, the vehicle-skidding phenomenon or the like due to the traveling on the inclined road can be easily prevented.

A method of controlling braking when steering an in-wheel motor vehicle, according to the present disclosure, will be described below.

Figure 5:
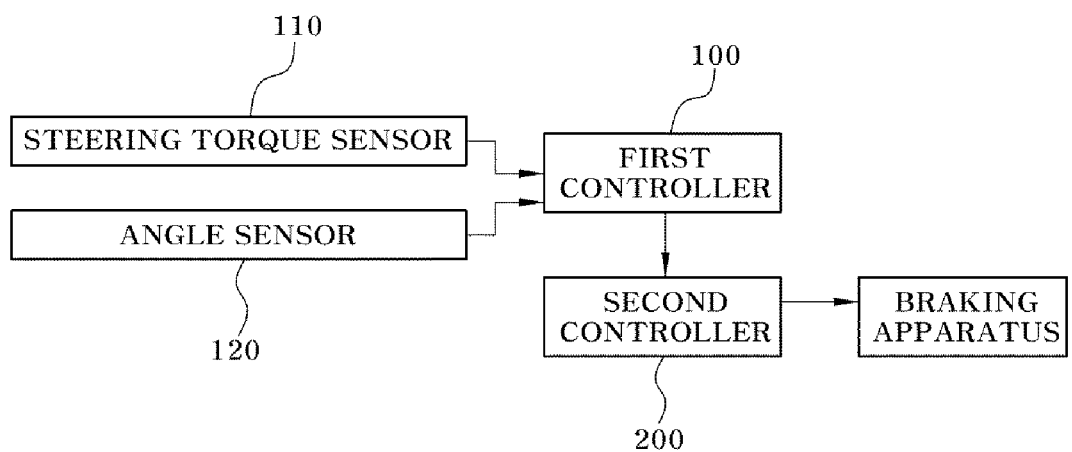
FIG. 5 is a configuration diagram for controlling braking when steering an in-wheel motor vehicle, according to an exemplary embodiment of the present disclosure.
Figure 6:
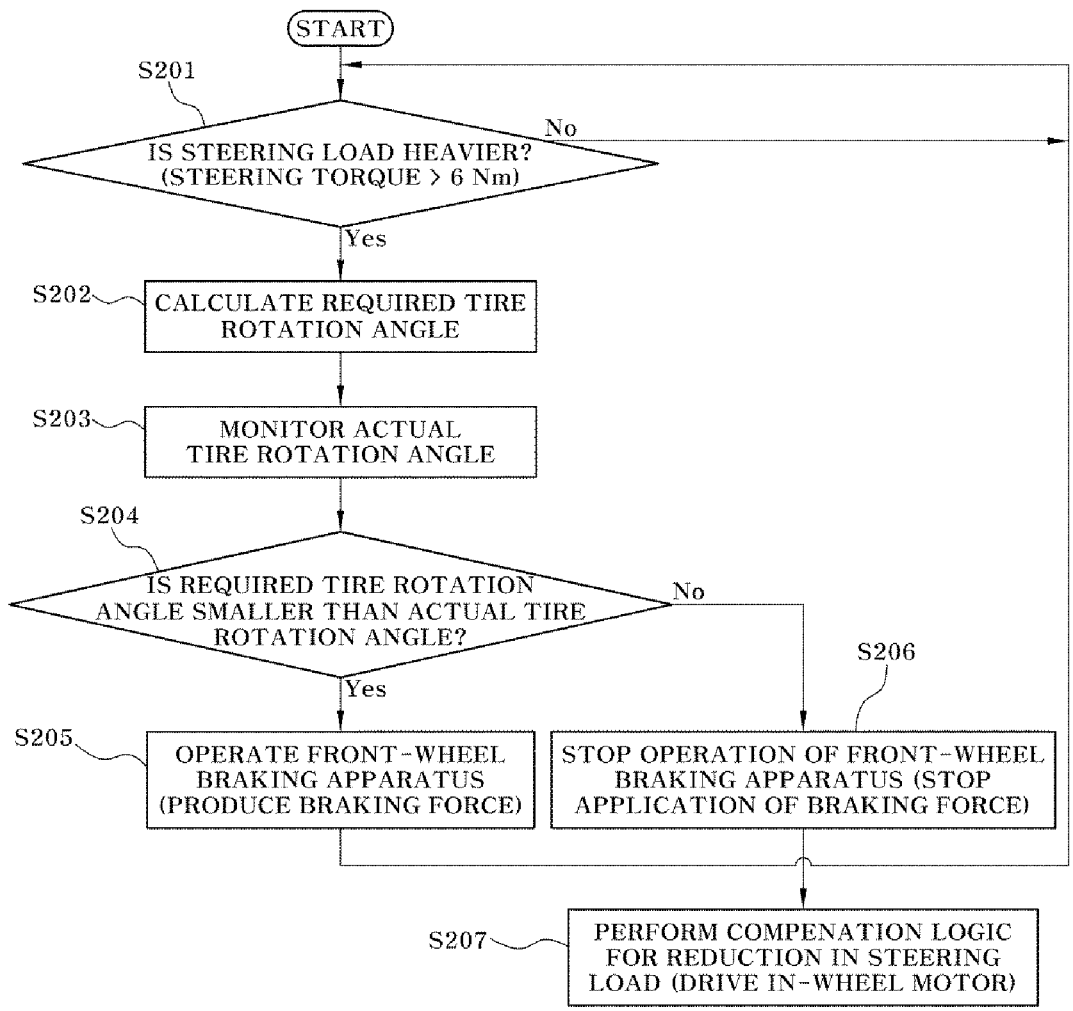
FIG. 6 is a flowchart illustrating a method of controlling braking when steering the in-wheel motor vehicle, according to an exemplary embodiment of the present disclosure.

FIG. 5 is a configuration diagram for controlling braking when steering the in-wheel motor vehicle, according to an exemplary embodiment of the present disclosure. FIG. 6 is a flowchart illustrating the method of controlling braking when steering the in-wheel motor vehicle, according to an exemplary embodiment of the present disclosure.

First, in order to decide whether or not the cooperative control of the in-wheel motor for reducing the steering load is necessary, when the driver steers the steering wheel, the magnitude of a steering load is determined (S201).

For example, a first controller 100 determines whether or not the steering torque measured by a steering torque sensor 110 exceeds a reference value (for example, 6 Nm).

When the result of the determination is that the steering torque exceeds the reference value, before performing the cooperative control of the in-wheel motor for reducing the steering load, it is determined whether or not a vehicle-skidding phenomenon occurs in the situation where the load on the vehicle is heady (for example, when the vehicle travels on the inclined road, when five or more persons ride in the vehicle, or the like).

As described above, in the situation where the load on the vehicle is heavy, the vehicle-skidding phenomenon may occur due to the temporary non-application of the braking force of the front-wheel braking apparatus for the substantial cooperative control of the in-wheel motor. Therefore, the reason for determining, before performing the substantial cooperative control of the in-wheel motor for reducing the steering load, whether or not the situation where the load on the vehicle is heavy occurs (for example, when the vehicle travels on the inclined road, when five or more persons ride in the vehicle, or the like) is for preferentially performing a logic for preventing the skidding of the vehicle.

A step of determining whether or not the vehicle-skidding phenomenon occurs in the situation where the load on the vehicle is heavy includes Step S202 of determining the required tire rotation angle θ for steering the steering wheel, Step S203 of monitoring an actual tire rotation angle, and Step S203 of comparing the required tire rotation angle θ determined in Step S202 and the actual tire rotation angle monitored in Step S203, all of which are performed in the first controller 100.

In Step S202 of determining the required tire rotation angle θ for steering the steering wheel, as illustrated in FIG. 4, the required tire rotation angle θ may be determined using the required movement distance L of the tire for reducing the steering load and the wheel radius R.

Accordingly, the required tire rotation angle θ may be determined using the above Equation 2.

At this time, the amount A of the movement of the tire wheel center and the required movement distance L of the tire are almost the same. Therefore, the required tire rotation angle θ may also be obtained using the above Equation 3.

In Step S203 of monitoring the actual tire rotation angle, the actual tire rotation angle may be detected using an angle sensor 120 of the in-wheel motor or a wheel speed.

Step S203 of comparing the required tire rotation angle θ determined in Step S202 and the actual tire rotation angle monitored in Step S203 are performed by the first controller 100.

For example, the first controller 100 compares a difference between the required tire rotation angle θ that is determined using the above Equation 3 and the actual tire rotation angle represented by a detection signal transferred by the angle sensor 120 of the in-wheel motor.

When the result of the comparison is that the actual tire rotation angle does not exceed the required tire rotation angle θ, it is determined that the vehicle-skidding phenomenon does not occur in the situation where the load on the vehicle is heavy, and then, the first controller 100 causes the braking force of the front-wheel braking apparatus to temporarily stop being applied, in order to perform the compensation logic for the substantial reduction in the steering load (S206).

That is, when the steering torque exceeds the reference value, the in-wheel motor has to be driven in order to perform the cooperative control of the in-wheel motor for reducing the steering load, and additionally, it is checked that the vehicle-skidding phenomenon does not occur in the situation where the load on the vehicle is heavy. Therefore, the braking force of the front-wheel braking apparatus is caused to temporarily stop being applied.

In other words, when, from the signal of the brake pedal sensor (BPS), it is checked that the driver keeps on pushing on the brake pedal, the first controller 100 has to drive the in-wheel motor in order to perform the cooperative controlling of the in-wheel motor for reducing the steering load. Therefore, the first controller 20 forces the braking force of the front-wheel braking apparatus to temporarily stop being applied and thus causes the in-wheel motor to be in the state where the driving control is possible.

Therefore, as in Step S106 described above, the first controller 100 performs the compensation logic for the substantial reduction in the steering load (S207).

In other words, in Step S207 in which the first controller 100 performs the compensation logic for the substantial reduction in the steering load, the in-wheel motor of the front wheel is forced to be driven by an angle as large as the required tire rotation angle θ, and thus the steering load is reduced.

For example, as described above, with the control signal of the controller 100, the respective left and right in-wheel motors 30 and 32 of the front wheels are forced to be driven by an angle as large as the required tire rotation angle θ. Thus, the cooperative control of the in-wheel motor, which drives the outside wheel (the outside tire with respect to the steering direction) of the front wheels in the forward direction and, at the same time, drives the inside wheel (the inside tire with respect to the steering direction) of the front wheels in the backward direction, is performed. As a result, the steering load can be reduced. Furthermore, when the driver keeps on pushing on the brake pedal after the performing of the compensation logic for the reduction in the steering load is finished, the braking force due to the operation of the front-wheel braking apparatus is produced.

Conversely, when the result of the comparison in Step S203 is that the actual tire rotation angle exceeds the required tire rotation angle θ, it is determined that the vehicle-skidding phenomenon occurs in the situation where the load on the vehicle is heavy, and then, the first controller 100 causes the compensation logic for the substantial reduction in the steering load, to temporarily stops being performed and, at the same time, generates the braking force of the front-wheel braking apparatus (S205).

That is, the exceeding by the actual tire rotation angle of the required tire rotation angle θ necessary for the cooperative control of the in-wheel motor for reducing the steering load can be regarded as the tire being rotated by a larger angle than is required when the vehicle-skidding phenomenon occurs. Therefore, the cooperative control of the in-wheel motor for reducing the steering load is caused to temporarily stop being performed, and at the same time, the braking force of the braking apparatus is generated. Thus, the vehicle-skidding phenomenon due to the traveling on the inclined road, or the like can be easily prevented.

For reference, in a case where the first controller 100 that decides to temporary stop the cooperative control of the in-wheel motor for reducing the steering load is a controller (MDPS-ECU) of the steering apparatus, the control that generates the braking force of the braking apparatus may be performed by a second controller 200 that is a braking controller (ESC ECU).

In other words, when, from the signal of the brake pedal sensor (BPS), it is checked that the driver keeps on pushing on the brake pedal, the first controller 100 transfers a signal, that decides to temporary stop the cooperative control of the in-wheel motor for reducing the steering load, to the second controller 200 that is the braking controller, the second controller 200 performs control that maintains the braking force due to the operation of the front-wheel braking apparatus, and thus can easily prevent the vehicle-skidding phenomenon or the like due to the traveling on the inclined road.

In this manner, before the substantial cooperative control of the in-wheel motor for reducing the steering load is performed, when the vehicle-skidding phenomenon occurs in the situation where the load on the vehicle is heavy (for example, when the vehicle travels on an inclined road, when five or more persons ride in the vehicle, or the like), the braking force of the front-wheel braking apparatus is generated and thus the vehicle-skidding phenomenon can be easily prevented.

What is claimed is:

1. A method of controlling braking when steering an in-wheel motor vehicle, the method comprising:
    deciding, by a first controller, whether or not cooperative control of an in-wheel motor for reducing a steering load is necessary;
    determining, by the first controller, before performing the cooperative control of the in-wheel motor for reducing the steering load, whether or not a vehicle-skidding phenomenon occurs;
    performing, by a second controller, control that maintains a braking force due to operation of a braking apparatus when the first controller determines that the vehicle-skidding phenomenon occurs; and
    performing, by the first controller, the cooperative control of the in-wheel motor for reducing the steering load when the first controller determines that the vehicle-skidding phenomenon does not occur.

2. The method according to claim 1, wherein, in the deciding whether or not cooperative control of an in-wheel motor is necessary, the cooperative control of the in-wheel motor for reducing the steering load is decided as being necessary when a result of comparing a steering torque, measured by a steering torque sensor when steering a steering wheel, and a reference value is that the steering torque exceeds the reference value.

3. The method according to claim 1, wherein the determining whether or not a vehicle-skidding phenomenon occurs comprises:
    determining a required tire rotation angle $\theta$ for steering a steering wheel;
    monitoring an actual tire rotation angle; and
    comparing the determined required tire rotation angle $\theta$ and the monitored actual tire rotation angle, wherein:
    the first controller determines that the vehicle-skidding phenomenon occurs when the actual tire rotation angle exceeds the required tire rotation angle $\theta$, and
    the first controller determines that the vehicle-skidding phenomenon does not occur when the actual tire rotation angle does not exceed the required tire rotation angle $\theta$.

4. The method according to claim 3, wherein
    in the determining a required tire rotation angle $\theta$ for steering a steering wheel, the required tire rotation angle $\theta$ is determined using $\theta=L\times360/(2\pi R)$ where 'L' is a required movement distance of a tire for reducing the steering load and 'R' is a wheel radius, or the required tire rotation angle $\theta$ is determined using $\theta=K/R\times\alpha$ where 'K' is a distance between a kingpin axis and a tire wheel center and '$\alpha$' is a current tire rotation angle.

5. The method according to claim 3, wherein
    in the monitoring an actual tire rotation angle, an angle sensor mounted on the in-wheel motor transfers a signal representing the detected actual tire rotation angle to the first controller.

6. The method according to claim 1, wherein
    in the performing control that maintains a braking force due to operation of a braking apparatus, the second controller performs the control that maintains the braking force due to operation of a front-wheel braking apparatus when the first controller transfers a signal, that decides to temporarily stop the cooperative control of the in-wheel motor for reducing the steering load, to the second controller.

7. The method according to claim 1, wherein the deciding whether or not cooperative control of an in-wheel motor for reducing a steering load is necessary comprises:
    temporarily stopping an application of the braking force of the braking apparatus such that the in-wheel motor is driven;
    determining a required tire rotation angle $\theta$ for reducing the steering load; and
    driving the in-wheel motor by an angle as large as the required tire rotation angle $\theta$.

* * * * *